(12) United States Patent
Borra et al.

(10) Patent No.: US 11,829,391 B2
(45) Date of Patent: Nov. 28, 2023

(54) SYSTEMS, METHODS, AND APPARATUSES FOR EXECUTING A GRAPH QUERY AGAINST A GRAPH REPRESENTING A PLURALITY OF DATA STORES

(71) Applicant: Salesforce, Inc., San Francisco, CA (US)

(72) Inventors: Ajay Krishna Borra, Hyderabad (IN); Manpreet Singh, Hyderabad (IN); Himanshu Mittal, Hyderabad (IN); Mitesh Jain, Secunderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/247,468

(22) Filed: Jan. 14, 2019

(65) Prior Publication Data

US 2020/0226156 A1 Jul. 16, 2020

(51) Int. Cl.
*G06F 16/28* (2019.01)
*G06F 16/21* (2019.01)
*G06F 16/903* (2019.01)
*G06F 16/901* (2019.01)

(52) U.S. Cl.
CPC .......... *G06F 16/288* (2019.01); *G06F 16/212* (2019.01); *G06F 16/9024* (2019.01); *G06F 16/90335* (2019.01)

(58) Field of Classification Search
CPC .............................................. G06F 16/24552
See application file for complete search history.

(56) References Cited

U.S. PATENT DOCUMENTS

| 8,156,134 B2* | 4/2012 | Sun ...................... G06F 16/2452 707/706 |
| 2009/0228474 A1* | 9/2009 | Chiu .................... G06F 16/9024 |
| 2015/0095303 A1* | 4/2015 | Sonmez ................. G06N 5/003 707/707 |
| 2017/0046349 A1* | 2/2017 | Shankar .............. G06F 16/2425 |
| 2017/0083571 A1* | 3/2017 | Shankar ............... G06F 16/282 |

(Continued)

*Primary Examiner* — Dawaune A Conyers
(74) *Attorney, Agent, or Firm* — Polygon IP, LLP

(57) ABSTRACT

Embodiments of the invention identify entities stored within or across a number of data stores and identify relationships between the entities. A relationships graph is generated that represents the entities and the identified relationships between entities, the relationships graph comprising nodes in the relationships graph to represent one or more entities and edges between any two nodes in the relationships graph to represent the identified relationships between the one or more entities represented by each of the two nodes. The relationships graph is stored in a graph store. A graph query is received against selected nodes and edges in the graph store. One or more data store queries are generated therefrom, to be executed against respective selected ones of the one or more entities and their respective identified relationships based on the graph query and the graph store. The one or more data store queries are applied to selected one or more of the number of data stores. The results of the execution of the one or more data store queries are received and a response is composed to the graph query for the selected ones of the one or more entities and their identified relationships based on the results of the execution of the one or more data store queries.

24 Claims, 9 Drawing Sheets

(56) References Cited

U.S. PATENT DOCUMENTS

| | | | |
|---|---|---|---|
| 2017/0212931 A1* | 7/2017 | Chen | G06F 16/245 |
| 2017/0236079 A1* | 8/2017 | Venna | G06F 16/9535 |
| | | | 705/4 |
| 2019/0317938 A1* | 10/2019 | Agarwalla | G06F 17/11 |
| 2019/0324989 A1* | 10/2019 | Borochoff | G06F 16/282 |

* cited by examiner

200

ASSET DATABASE 205

| SERIAL NUMBER | VENDOR | LEASE (YEARS) |
|---|---|---|
| 9SDAGBHK | VENDOR 1 | 3 |
| 9SABJHKP | VENDOR 2 | 2 |
| 7SOBJ8HO | VENDOR 1 | 5 |

OPERATIONAL DATABASE 210

| HOST ID | EVENT | DESCRIPTION |
|---|---|---|
| 9SDAGBHK | DISK ERROR | FATAL ERROR |
| 9SDAGBHK | REBOOT | POWER OUTAGE |
| 9SABJHKP | FAN ERROR | MALFUNCTION |

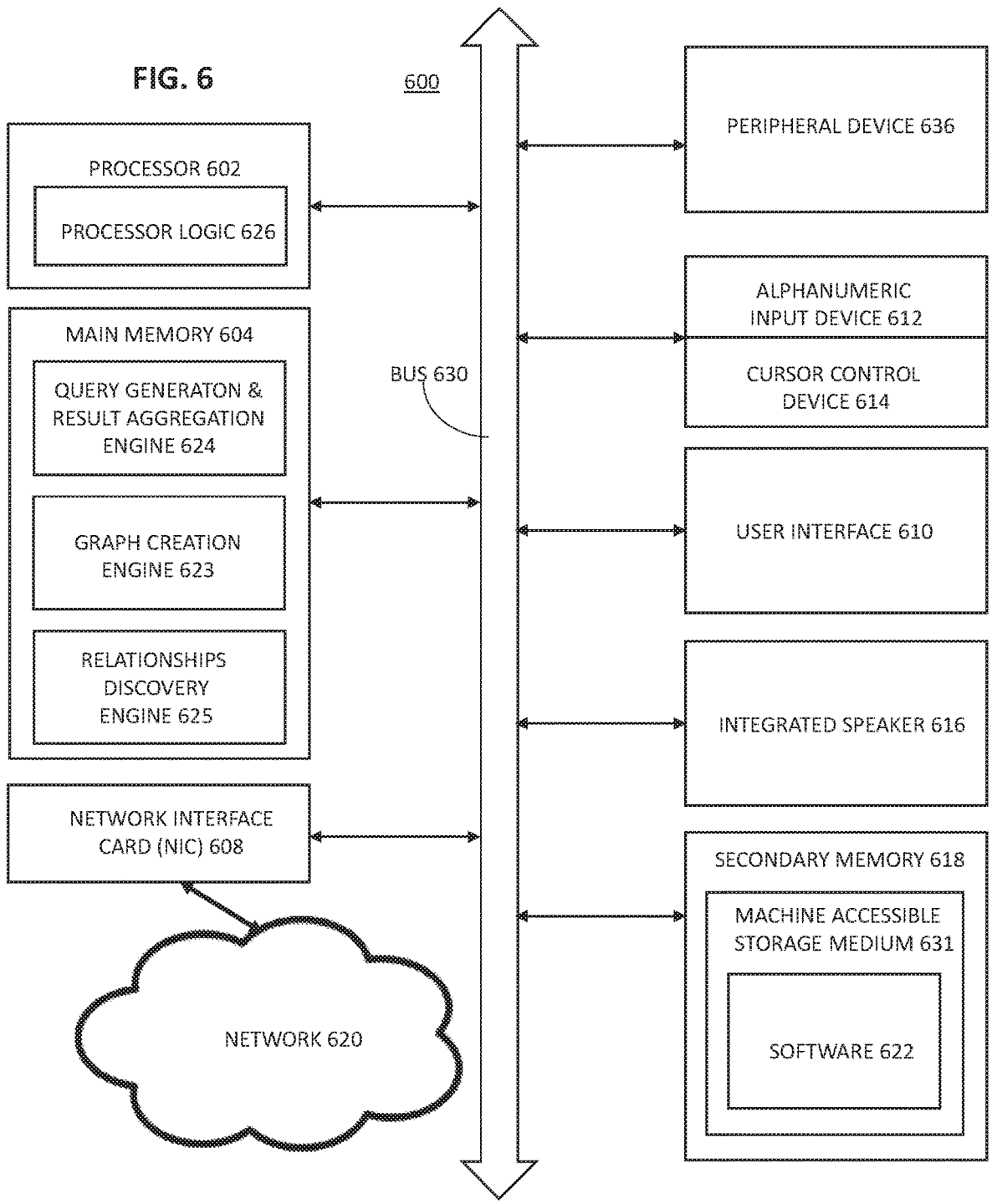

SYSTEMS, METHODS, AND APPARATUSES FOR EXECUTING A GRAPH QUERY AGAINST A GRAPH REPRESENTING A PLURALITY OF DATA STORES

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of database queries, and, in particular, to generating a graph of entities and their relationships within or across a number of relational databases and unstructured data stores, and performing graph queries on the graph. The graph query is converted to database queries executed against the databases, and the results of the queries are composed into a response to the graph query.

BACKGROUND

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

The prior art, when querying across multiple databases, combines entities from multiple data stores or relational databases into a single data store against which relational database queries are made. Such an approach is problematic since different databases have, of course, different formats, which makes combining data from different databases difficult. Further, once the data is copied from multiple databases to a single database, the data possibly is stale, out-of-sync, or out-of-date, soon after copying the data. Such approaches risk loss of data consistency, and add significant overhead and complexity when performing database queries across a number of databases.

The present state of the art may therefore benefit from the systems, methods, and apparatuses for executing a graph query against a graph that represents a plurality of data stores, for example, within a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 6 illustrates a diagrammatic representation of a machine in the exemplary form of a computer system, in accordance with one embodiment.

DETAILED DESCRIPTION

Figure 1:
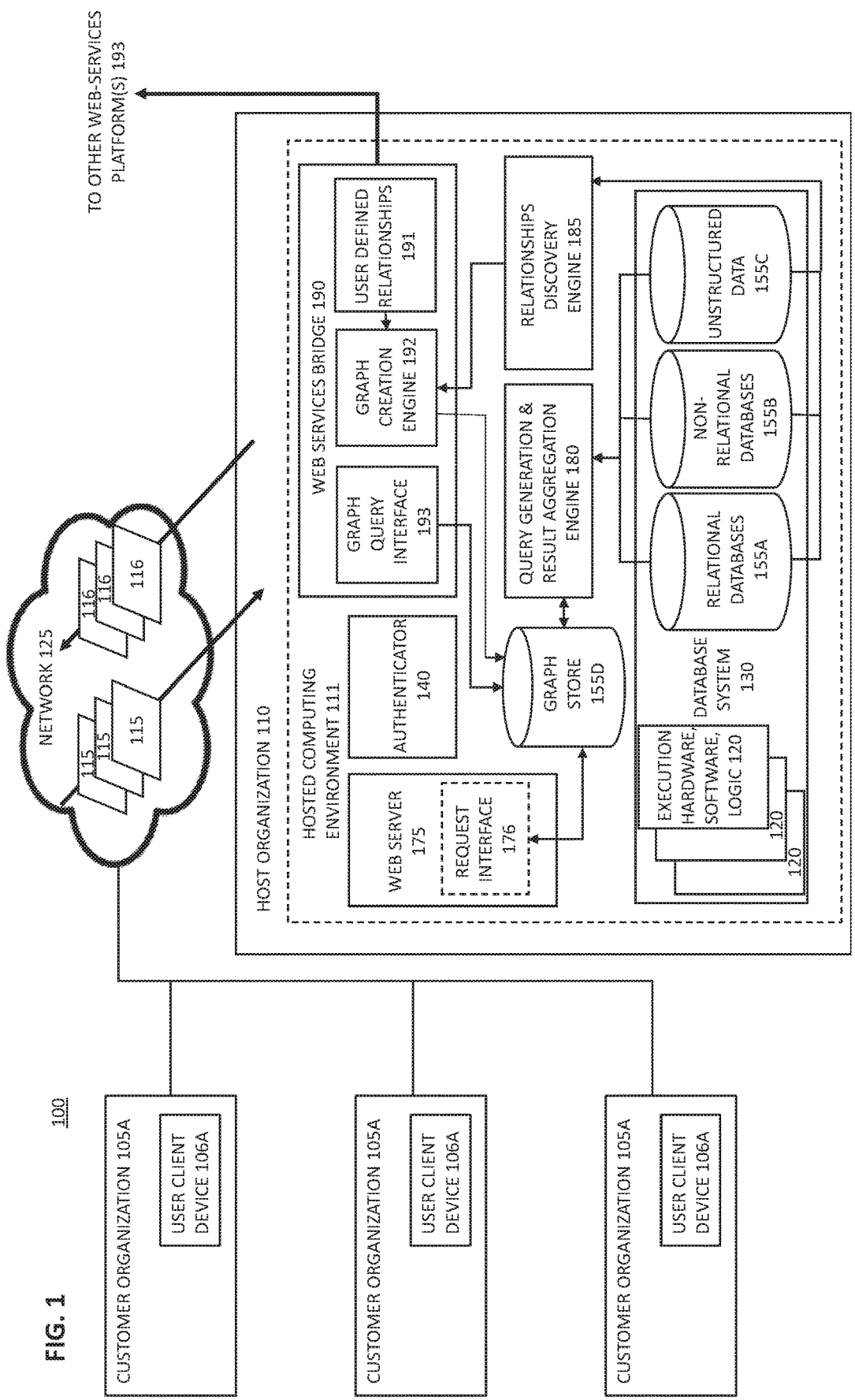
FIG. 1 depicts an exemplary architecture in accordance with described embodiments.

Described herein are systems, methods, and apparatuses for executing a graph query against a set of databases. For instance, such an exemplary system having a processor and a memory therein executes instructions to cause the system to identify entities stored within or across multiple data stores and identify relationships between the entities, generate a relationships graph that represents the entities and the identified relationships between entities, the relationships graph comprising nodes in the relationships graph to represent one or more entities and edges between any two nodes in the relationships graph to represent the identified relationships between the one or more entities represented by each of the two nodes, store the relationships graph in a graph store, receive a graph query against selected nodes and edges in the graph store, generate one or more data store queries to be executed against respective selected ones of the one or more entities and their respective identified relationships based on the graph query and the graph store, execute the one or more data store queries against the selected one or more of the multiple data stores, receive results of the execution of the one or more data store queries, and compose a response to the graph query for the selected ones of the one or more entities and their identified relationships based on the results of the execution of the one or more data store queries. In so doing, embodiments create a unified data fabric for applications to consume data using a graph query interface on top of heterogeneous SQL, NoSQL, and unstructured data stores.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

Various terms are used herein below, the definitions of which are as follows.

An attribute-value pair, or attribute-value tuple, or attribute-value triple may be a name-value pair, a key-value pair, a field-value pair or attribute-value pair and is a fundamental data representation in computing systems and applications. Database designers prefer an open-ended data structure that allows for future extension without modifying existing code or data. In such situations, all or part of the data model may be expressed as a collection of 2-tuples in the form <attribute name, value> with each element being an attribute-value pair. Depending on the particular application and the implementation chosen by programmers, attribute names may or may not be unique.

Computer languages may implement attribute-value pairs, or collections of attribute-value pairs, as standard language features. Most of these implement the general model of an associative array: an unordered list of unique attributes with associated values. In some applications, an attribute-value pair has a value that contains a nested collection of attribute-value pairs.

A correlation is simply defined as a relationship between two variables. The whole purpose of using correlations in research is to figure out which variables are connected. Correlation analysis is a method of statistical evaluation used to study the strength of a relationship between two, numerically measured, continuous variables (e.g. height and weight). This particular type of analysis is useful when a researcher wants to establish if there are possible connections between variables. It is often misunderstood that correlation analysis determines cause and effect; however, this is not the case because other variables that are not present in the research may have impacted on the results.

According to correlational analysis, if a correlation is found between two variables it means that when there is a change in one variable, there is also a change in the other variable. The variables alter together over a certain period of time. If there is correlation found, depending upon the numerical values measured, this can be either positive or negative. A positive correlation exists if one variable increases simultaneously with the other, i.e., the high numerical values of one variable relate to the high numerical values of the other. A negative correlation exists if one variable decreases when the other increases, i.e., the high numerical values of one variable relate to the low numerical values of the other. Embodiments of the invention may make use of correlational analysis at block 191, which provides for user input for identifying relationships between entities within or across data stores, and at relationships discovery engine 185 which provides for automatic discovery or identification of relationships between entities.

An entity is any object in a system that is modeled and about which embodiments of the invention store information. Entities typically are recognizable concepts, whether concrete or abstract, such as persons, places, things, or events that have relevance within or across databases. Some specific examples of entities are an employee, a piece of equipment, a status of a person or piece of equipment. An entity can have zero or more attributes that apply only to that entity and define the information about the entity that needs to be stored. For example, if the entity is an employee, attributes could include the employee's name, the employee's ID, health plan enrollment status, and work location.

Embodiments of the invention store data about such entities within or across multiple databases or data sources. Embodiments of the invention allow a database administrator, or a user, such as a customer or client (e.g., a tenant or a user of a tenant in a multi-tenant database system) of a cloud computing services provider, to define and/or view entities and the relationships between entities. In one embodiment, a user can define and view such relationships via a user interface 191 for defining and viewing such relationships. For example, a user may provide an entity relationship model or entity relationship diagram (ERD). An ERD is an abstract data model that defines a data structure that can be implemented in a database, typically a relational database.

An ERD describes interrelated things of interest in a specific domain of knowledge. For example, an ERD may represent things that a business needs to remember in order to perform business processes. A basic ERD may be composed of entity types (which classify the things of interest) and specifies relationships that can exist between instances of those entity types.

In the context of relational databases, a foreign key is a field (or collection of fields) in one table that uniquely identifies a row of another table or the same table. In other words, the foreign key is defined in a second table, but it refers to the primary key or a unique key in the first table. For example, a table called Employees has a primary key called employee_id. Another table called Employee Details has a foreign key which references employee_id in order to uniquely identify the relationship between the two tables.

The table containing the foreign key is typically called the child table, and the table containing the candidate key is called the referenced or parent table. In database relational modeling and implementation, a unique key is a set of zero or more attributes, the values of which are guaranteed to be unique for each tuple (row) in a relation. The value or combination of values of unique key attributes for any tuple cannot be duplicated for any other tuple in that relation.

When more than one column is combined to form a unique key, their combination is used to access each row and maintain uniqueness. The values of the columns are not combined. Rather, they are compared using their data types.

Foreign keys play an important role in database design. One important part of database design is making sure that relationships between entities are reflected in the database by references, using foreign keys to refer from one table to another. Another important part of database design is database normalization, in which tables are broken apart and foreign keys make it possible for them to be reconstructed.

Multiple rows in the referencing (or child) table may refer to the same row in the referenced (or parent) table. In this case, the relationship between the two tables is called a one to many relationship between the referenced table and the referencing table. In addition, the child and parent table may, in fact, be the same table, i.e., the foreign key refers back to the same table. Such a foreign key is known as a self-referencing or recursive foreign key. In database management systems, this is often accomplished by linking a first and second reference to the same table.

A table may have multiple foreign keys, and each foreign key can have a different parent table. Each foreign key is enforced independently by the database system. Therefore, cascading relationships between tables can be established using foreign keys.

Embodiments of the invention may make use of foreign keys at block 191 which provides for user input regarding identifying relationships between entities within or across data stores, and at relationships discovery engine 185 which provides for automatic discovery or identification of relationships between entities.

A graph database, in computing, is a database that uses graph structures for semantic queries with nodes, edges and properties to represent and store data. An important concept of the system is the graph (or edge or relationship), which directly relates data items in the store. The relationships allow data in the store to be linked together directly, and in many cases retrieved with one operation.

This contrasts with relational databases that, with the aid of relational database management systems, permit managing the data without imposing implementation aspects like physical record chains. For example, links between data are stored in the database itself at the logical level, and relational algebra operations (e.g. join) can be used to manipulate and return related data in the relevant logical format. The execution of relational queries is possible with the aid of the database management systems at the physical level (e.g. using indexes), which permits improving performance without modifying the logical structure of the database.

Graph databases, by design, allow simple and faster retrieval of complex hierarchical structures that perhaps are difficult to model in relational systems. The underlying storage mechanism of graph databases can vary. According to some embodiments, the graph database depends on a relational engine and store the graph data in a table (although a table is a logical element, so this approach imposes another level of abstraction between the graph database, the graph database management system, and the physical devices where the data is actually stored). According to other embodiments, graphs use a key-value store or document-oriented database for storage, making them inherently noSQL structures. Graph databases based on non-relational storage engines, according to embodiments of the invention, may add the concept of tags or properties, which are essentially relationships having a pointer to another document. This allows data elements to be categorized for easy retrieval in a group or all together.

Retrieving data from a graph database requires a query language other than SQL, which was designed for the manipulation of data in a relational system and therefore cannot elegantly handle traversing a graph. Currently, no single graph query language has been universally adopted in the same way as SQL was for relational databases, and there are a wide variety of systems, most often associated with a particular product. Some standardization efforts have occurred, leading to multi-vendor query languages like Gremlin, SPARQL, and Cypher. In addition to having query language interfaces, some graph databases are accessed through application programming interfaces (APIs).

Independent of the total size of the dataset, graph databases excel at managing highly-connected data and complex queries. With only a pattern and a set of starting points, graph databases explore the neighboring data around those initial starting points, collecting and aggregating information from thousands, even millions, of nodes and relationships, and leaving any data outside the search perimeter untouched.

According to one embodiment, data in the graph database is organized as nodes, relationships, and properties (data stored on the nodes or relationships), the key components of a graph database adhering to the property graph model.

The components that make up the property graph model include the nodes which are the entities in the graph. They can hold any number of attributes (key-value pairs), also referred to as properties. Nodes can be tagged with labels, representing their different roles in a particular domain. Node labels may also serve to attach metadata to certain nodes. Relationships provide directed, named, semantically-relevant connections between two node entities (e.g., Employee WORKS_FOR Company). A relationship has a direction, a type, a start node, and an end node. Like nodes, relationships can also have properties. In most cases, relationships have quantitative properties, such as weights, costs, distances, ratings, time intervals, or strengths. Due to the efficient way relationships are stored, two nodes can share any number or type of relationships without sacrificing performance. Although they are stored in a specific direction, relationships can be navigated efficiently in either direction.

A relationships graph, or simply, graph, herein, uses tables to organize a view into the data contained in the tables. Each table occurrence in the graph represents a separate view into the data. When two tables are joined, two existing views are leveraged to create a third way of viewing the data. For example, if there is an invoices table with invoice ID and customer information, and a line items table storing product orders for each line of each invoice, a relationship must be created between the two tables before data can be displayed from the line items table on an invoices layout.

A relationship is created between any two tables in the relationships graph. According to an embodiment, the relationship must not create a cycle, or closed loop between tables. That is, each series of relationships must have a starting table and an ending table, and those tables must be different tables. Because each relationship represents an additional set of criteria, embodiments are aware of the context within the relationships graph. Context is the point in the graph from which a relationship is evaluated. Because the graph is not a cycle, each point along the graph offers a different perspective into the data.

Semantic queries allow for queries and analytics of an associative and of a contextual nature. Semantic queries enable the retrieval of both explicitly and implicitly derived information based on syntactic, semantic and structural information contained in data. They are designed to deliver precise results (e.g., possibly the distinctive selection of a single piece of information) or to answer more fuzzy and wide open questions through pattern matching and machine reasoning.

Semantic queries work on named graphs, linked-data or triples. This enables the query to process the actual relationships between information and infer the answers from the network of data. This is in contrast to a semantic search, which uses semantics (the science of meaning) in unstructured text to produce a better search result (e.g., natural language processing).

From a technical point of view, semantic queries are precise relational-type operations much like a database query. They work on structured data and therefore have the possibility to utilize comprehensive features like operators (e.g. >, < and =), namespaces, pattern matching, subclassing, transitive relations, semantic rules and contextual full text search.

Relational databases contain all relationships between data in an implicit manner only. For example, the relationships between customers and products (stored in two content-tables and connected with an additional link-table) only come into existence in a query statement (SQL in the case of relational databases) written by a developer. Writing the query demands exact knowledge of the database schema.

Linked data contain all relationships between data in an explicit manner—no query code needs to be written. The correct product for each customer can be fetched automatically. The real power of linked data comes into play when a network of information is created. Embodiments can then automatically answer more complex queries and analytics that look for the connection between two entities, for example, the connection of a particular location with a product category. The development effort for this query is omitted. Executing a semantic query is conducted by walking the network of information and finding matches (also called a data graph traversal).

Another aspect of semantic queries is that the type of the relationship can be used to incorporate intelligence into the system. The relationship between a customer and a product has a fundamentally different nature than the relationship between a neighborhood and its city. The latter enables the semantic query engine to infer that a customer living in a particular neighborhood is also living in the city where that neighborhood is located whereas other relationships might have more complicated patterns and contextual analytics. This process is known as inference or reasoning and provides the ability of for embodiments of the invention to derive new information based on given facts.

A tuple is a finite ordered list (sequence) of elements. An n-tuple is a sequence (or ordered list) of n elements, where n is a non-negative integer. Relational databases may formally identify their rows (records) as tuples.

Unstructured data (or unstructured information) is information that either does not have a pre-defined data model or is not organized in a pre-defined manner. Unstructured information is typically text-heavy, but may contain data such as dates, numbers, and facts as well. This may result in irregularities and ambiguities that make it difficult to understand using traditional programs as compared to data stored in fielded form in databases or annotated (semantically tagged) in documents.

Dealing with unstructured data involves techniques such as data mining, natural language processing (NLP), and text analytics to provide different methods to find patterns in, or otherwise interpret, this information. Common techniques for structuring text usually involve manual tagging with metadata or part-of-speech tagging for further text mining-based structuring. The Unstructured Information Management Architecture (UIMA) standard provides a common framework for processing this information to extract meaning and create structured data about the information.

Embodiments of the invention may generate a machine-processable structure with algorithms that can infer inherent structure from text, for instance, by examining word morphology, sentence syntax, and other small- and large-scale patterns. Unstructured information can then be enriched and tagged to address ambiguities and relevancy-based techniques can then used to facilitate search and discovery. Examples of unstructured data may include books, journals, documents, metadata, health records, audio, video, analog data, images, files, and unstructured text such as the body of e-mail messages, web pages, and word-processor documents. These types of unstructured data do not have a defined structure, and generally are packaged in objects (e.g., in files or documents) that themselves have structure and are, thus, a mix of structured and unstructured data, but collectively this is may still be referred to as unstructured data. For example, an HTML web page is tagged, but HTML mark-up typically used only for rendering the web page. It does not capture the meaning or function of tagged elements in ways that support automated processing of the information content of the page. XHTML tagging does allow machine processing of elements, although it typically does not capture or convey the semantic meaning of tagged terms.

Since unstructured data commonly occurs in electronic documents, the use of a content or document management system which can categorize entire documents may be preferred over data transfer and manipulation from within the documents. Document management thus provides a means to convey structure onto document collections.

In mathematics, and more specifically in graph theory, a vertex (plural vertices) or node is a fundamental unit from which graphs are formed. An undirected graph consists of a set of vertices and a set of edges (unordered pairs of vertices), while a directed graph consists of a set of vertices and a set of arcs (ordered pairs of vertices). In a diagram of a graph, a vertex is usually represented by a circle with a label, and an edge is represented by a line or arrow extending from one vertex to another.

In terms of graph theory, vertices are treated as featureless and indivisible objects, although they may have additional structure depending on the application from which the graph arises. For instance, a semantic network is a graph in which the vertices represent concepts or classes of objects.

Two vertices forming an edge are said to be the endpoints of the edge, and the edge is said to be incident to the vertices. A vertex w is said to be adjacent to another vertex v if the graph contains an edge (v,w). The neighborhood of a vertex v is an induced subgraph of the graph, formed by all vertices adjacent to v.

A workflow provides a way to automate certain business processes. A rule can be created, and based on certain criteria that are selected, the workflow can do a number of things, like send an email, create a task, or update a field in a database. More generally, a workflow can evaluate records as they are created and updated and determine if an automated action needs to occur. In a way, it allows records of information to speak up or do something—update data, notify people or external systems. Workflows replace the constant monitoring users have to otherwise do via reports, dashboard or views to know whether or not it is time to act. Simply put, a workflow accelerates business processes by removing the time lag needed for people to review information and decide if action is need. As a business grows, and the amount of data that has to be monitored swells, a workflow is very useful to organizations to maximize efficiency with their business processes.

The use cases for workflows are unlimited. As examples, a workflow can change a field value automatically when two other fields on a record are updated in the right combination, send an email to an external vendor after a certain number of days after a record has been updated, and assign a task to a user to let them know they need to review or update a record now that it has reached a certain stage.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes one or more relational databases 155A (e.g., SQL databases), one or more non-relational databases 155B (e.g., one or more noSQL or non-SQL databases), and one or more sources of unstructured data 155C, for example, to store application code, object data, tables, datasets, and underlying database records comprising user data on behalf of customer organizations 105A-C(e.g., users of such a database system 130 or tenants of a multi-tenant database type database system or the affiliated users of such a database system).

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes underlying hardware, software, and logic elements 120 that implement database functionality and a code execution environment within the host organization 110.

In accordance with one embodiment, database system 130 utilizes the underlying database system implementations 155A, 155B, and 155C to service database queries and other data interactions with the database system 130 that communicate with the database system 130 via the query interface. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 155. In such a way, host organization 110 may implement on-demand services, on-demand database services or cloud computing services to subscribing customer organizations 105A-C.

Further depicted is the host organization 110 receiving input and other requests 115 from customer organizations 105A-C via network 155 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155A, 155B, 155C, or the graph query interface 193 and query generation & result aggregation engine 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 155 on behalf of the graph query interface 193 and for providing a web-based interface or other graphical displays to an end-user user client device 106A-C or machine originating such data requests 115.

The graph query interface 193 is capable of receiving and executing requested queries against graph store 155D, which, in turn, are converted by database query generation and result aggregation engine 180 to database queries that are applied to the databases and storage components of the database system 130 and returning a result set, response, or other requested data, by way of database query generation and result aggregation engine 180 in furtherance of the embodiments described. The graph query interface 193 additionally provides functionality to pass queries from web-server 175 to graph store 155D, and then database query generation and result aggregation engine 180 provides functionality to convert or translate such queries into the database queries directed to database system 130 for execution against the databases 155, or into the other available data stores of the host organization's computing environment 111. In one embodiment, the graph query interface 193 implements an Application Programming Interface (API)

through which queries may be executed against graph store 155D, and then, in turn, executed against the databases 155 or the other data stores.

Graph creation engine 192 receives input from users, such as user defined relationships at 191, and/or from an automated relationships discovery engine 185, regarding entities stored in database system 130 and relationships between such entities. Graph creation engine creates a graph of selected entities across selected databases and unstructured data stores in database system 130 and creates a graph that is stored in graph store 155D, as further described below.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Figure 4A:
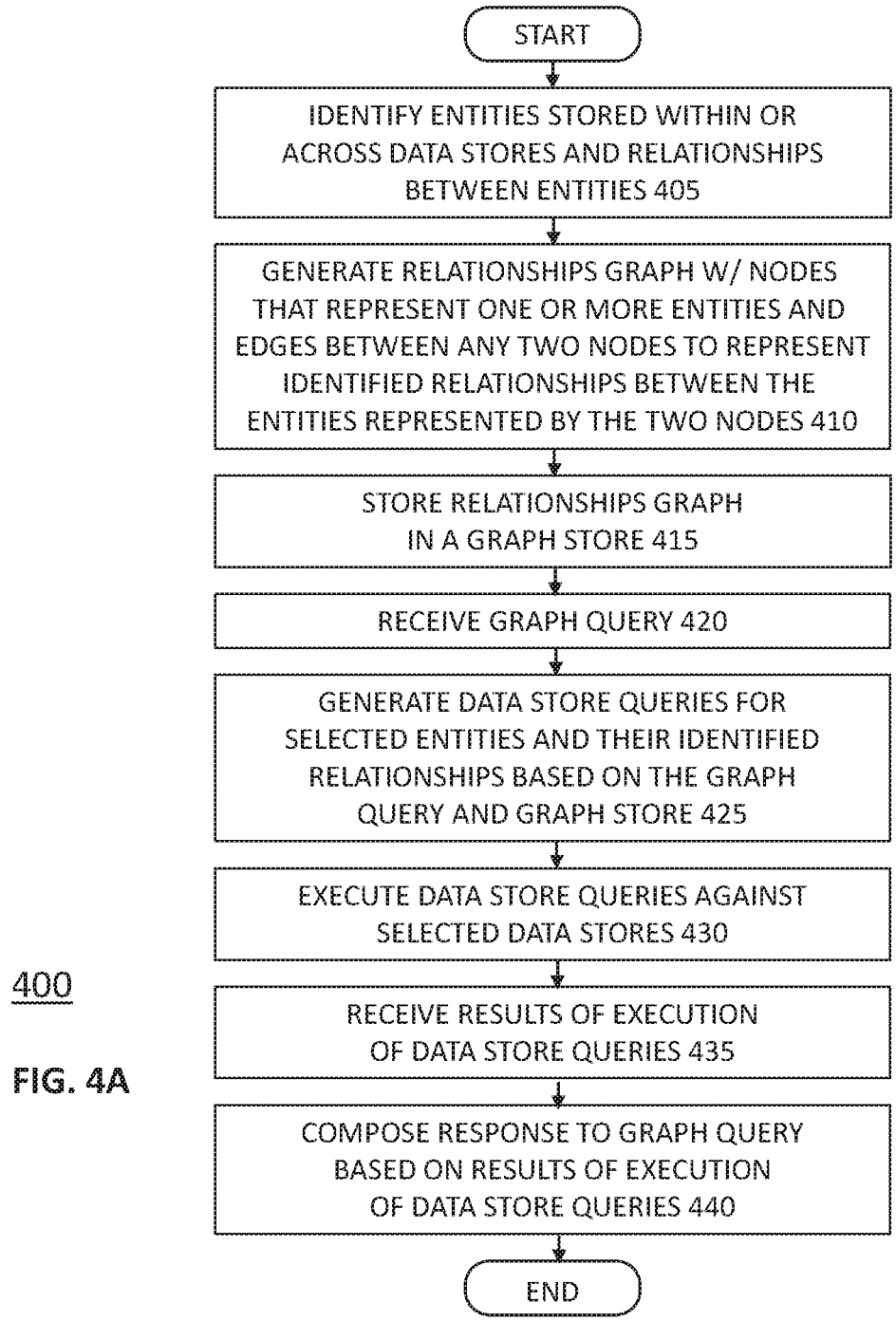
FIG. 4A is a flow chart of a method in accordance with embodiments of the invention.

FIG. 4A depicts a flow diagram illustrating a method 400 for implementing the execution of a graph query against a graph that represents a number of data stores in accordance with the disclosed embodiments. Method 400 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, the web-services bridge 190, and its database system 130 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

Figure 3:
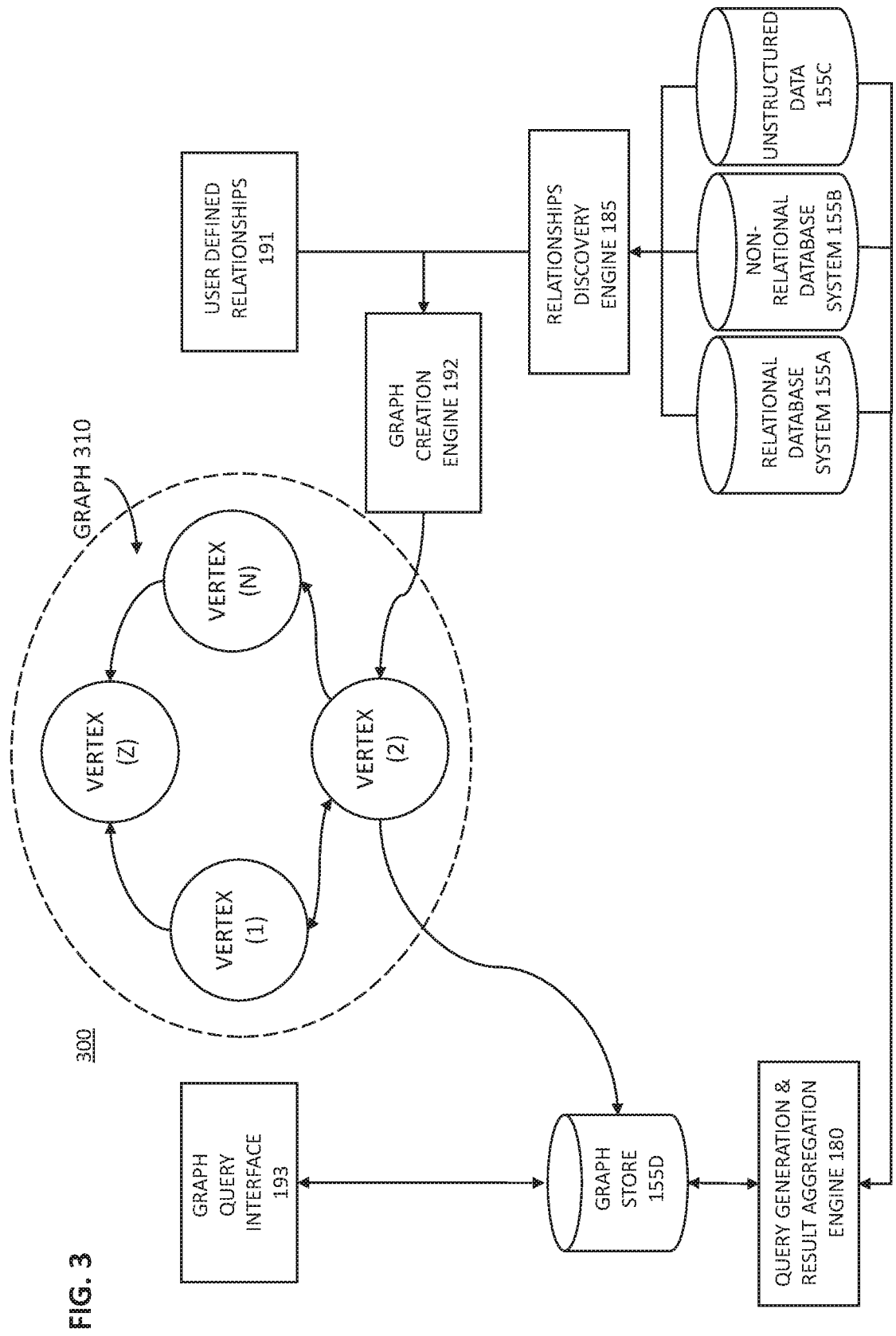
FIG. 3 illustrates a block diagram of embodiments of the invention.

With reference to the components illustrated in FIGS. 1 and 3, and with reference to the method 400 depicted at FIG. 4A, at block 405, a relationships discovery engine 185 identifies entities stored within or across a number of data stores and identifies relationships between the entities. User defined rules may also be input at block 191 through a user interface to identify relationships between entities. In one embodiment, relationship seeding is used, which is a process where a user can define mappings, relationships, edges between entities (fields) across all or a subset of participating databases and data stores, which can then be used by relationships discovery engine to create the graph. In one embodiment, the relationships discovery engine 185 may make use of available meta-data from participating databases, like the DDL of a schema, and determine field types and uses this information to inspect the data in the columns and create relationships mappings across the fields in the participating databases. Relationships can be either direct or derived relationships. A similar approach may be used to derive the relationships in unstructured data sources including query logs and other usage logs of the databases.

In one embodiment, the data stores may include zero or more relational databases 155A, zero or more non-relational databases 155B, and zero or more sources or stores 155C of unstructured data. In one embodiment, a relational database may be an SQL database, a non-relational database may be a non-SQL database. One embodiment may also store data in an unstructured database or store data as unstructured data, such as unstructured text.

Figure 4B:
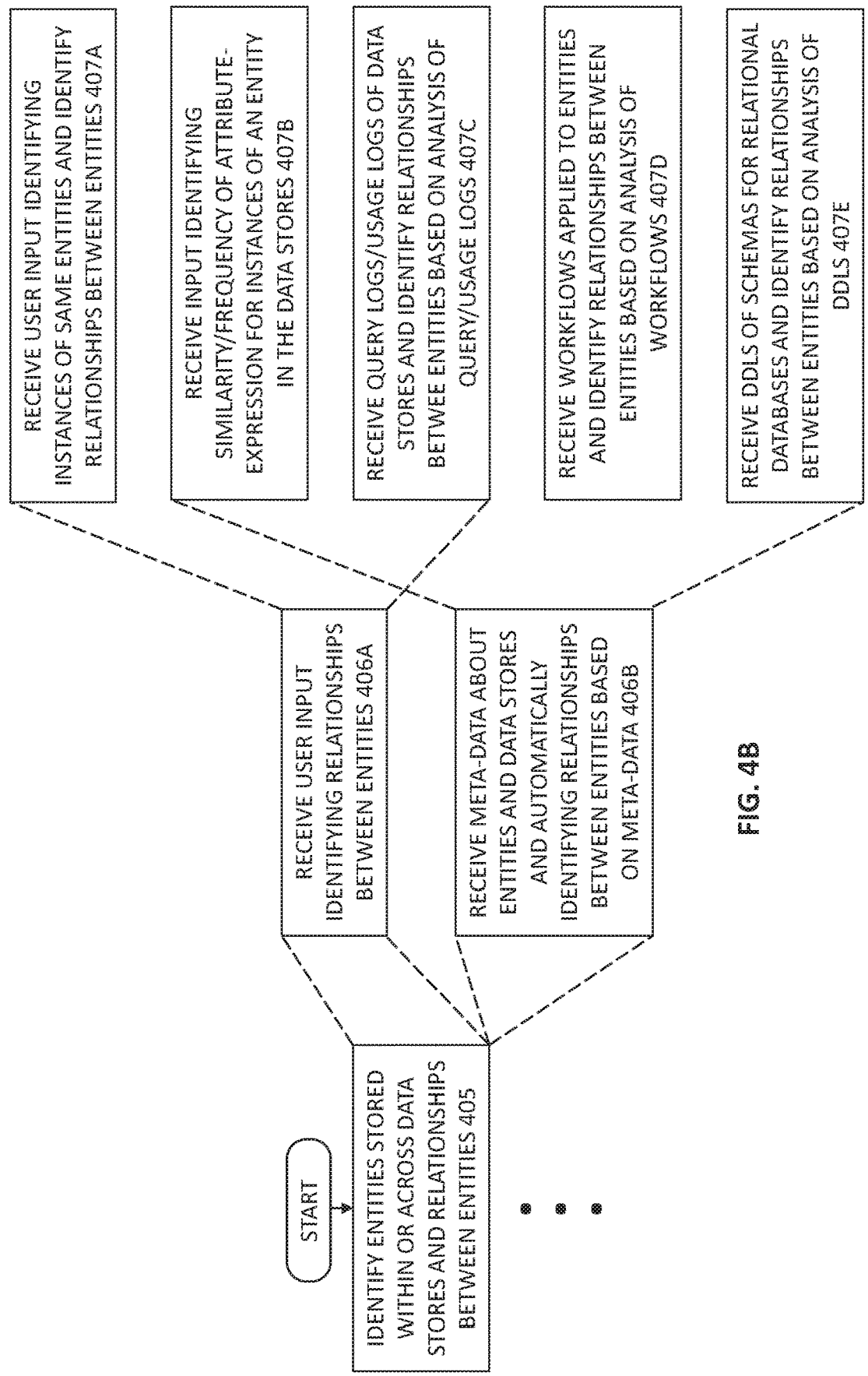
FIG. 4B is a flow chart of a selected step in a method in accordance with embodiments of the invention.

With reference to FIG. 4B, embodiments of the invention provide multiple means 406A and 406B for identifying entities stored within or across multiple data stores and identifying or discovering relationships between the entities. For example, according to one embodiment, at step 406A, user input may be received at block 191 that identifies entities and relationships between entities. Further, at step 406B, embodiments may receive meta-data about entities and data stores in which the entities are located, and automatically discover or identify relationships between entities within or across data stores. For example, using correlational analysis, or by inspecting foreign keys, a user or the system may discover or identify relationships between entities within or across data stores.

At step 406A, identifying entities stored within or across multiple data stores and identifying or discovering relationships between the entities may be accomplished according to various embodiments. For example, at step 407A, a user may view the contents of the data stores 155, or one or more ERDs of such, and explicitly identify entities within or across, the data stores. Likewise the user may view the tables, foreign keys, etc., and thereby identify relationships between entities. This information may be input at block 191 to a graph creation engine 192. As another example, at step 407B, a user may view the contents of the data stores 155, or one or more ERDs of such, and explicitly identify instances of the same entity, within or across, the data stores. In particular, the user may identify, via pattern matching or the like, the similarity between two instances of entities and decide the entities are the same, or similar enough that they are related, or may even be merged into a single instance of an entity by graph creation engine 192 if so instructed by such information being input at block 191 to a graph creation engine 192. Additionally, or alternatively, the user may identify, again, via pattern matching or the like, that the frequency of occurrence of an entity within or across the data stores suggests such an entity is an important or key entity and should be submitted via block 191 to graph creation engine 192 for implementation as a primary node in the graph 310, as further described below. As one more example, at step 407C, a user may receive and view the contents of the database query logs associated with one or more of the data stores, or the user may receive and view the contents of one or more usage logs associated with one or more of the data stores, and based on an analysis of such, identify entities within or across, the data stores, and identify relationships between entities. This information may be input at block 191 to graph creation engine 192.

At step 406B, identifying entities stored within or across multiple data stores and identifying or discovering relationships between the entities may be accomplished according to various embodiments. According to one embodiment, at step 407B, relationships discovery engine 185 may access the contents of the data stores 155, or one or more ERDs of such, and identify instances of the same entity, within or across, the data stores. In particular, relationships discovery engine 185 may identify, via pattern matching or the like, the similarity between two instances of entities and determine the entities are the same, or similar enough that they are related, or may even be merged into a single instance of an entity by graph creation engine 192 if so instructed by such information being input at by relationships discovery engine 185 to the graph creation engine 192. Additionally, or alternatively, relationships discovery engine 185 may identify, via pattern matching or the like, that the frequency of occurrence of an entity within or across the data stores suggests such an entity is an important or key entity and should be submitted to graph creation engine 192 for implementation as a primary node in the graph 310, as further described below. According to another embodiment, at step 407C, relationships discovery engine 185 may receive and analyze the contents of the database query logs associated with one or more of the data stores, or relationships discovery engine 185 may receive and analyze the contents of one or more usage logs associated with one or more of the data stores, and based on the analysis of such, identify entities within or across the data stores, and identify relationships between entities. This information may be input by relationships discovery engine 185 to graph creation engine 192.

According to another embodiment, at step 407D, relationships discovery engine 185 may receive and analyze workflows associated with one or more of the data stores, and based on the analysis of such, identify entities within or across the data stores, and identify relationships between entities. This information may be input by relationships discovery engine 185 to graph creation engine 192. Finally, according to another embodiment, at step 407E, relationships discovery engine 185 may receive and analyze the data dictionary languages (DDLs) of the schemas for one or more of the data stores, and based on the analysis of such, identify entities within or across the data stores, and identify relationships between entities. This information may be input by relationships discovery engine 185 to graph creation engine 192.

Referring back to FIG. 4A, at logic block 410, graph creation engine 192 receives all the information provided at step 405A, as described above, and generates a relationships graph 310 that graphically represents the entities and the identified relationships between entities. The relationships graph includes nodes (vertices, e.g., vertex(1), vertex (2), vertex(Z) . . . vertex(N) in graph 310) that each represent one or more entities, and includes edges between any two nodes in the relationships graph to represent the identified relationships between the one or more entities represented by each of the two nodes. The graph 310 is stored in a graph store, e.g., a graph database. The graph store, according to one embodiment, can hold the graph completely in-memory or persist the graph to a permanent store, such as a disk. The graph store may be used to store a graph of relationships of entities and receive requests from the query generation and result aggregation engine 150 to fetch data from the data stores 155A, 155B, 155C. Other embodiments of the graph store may store frequently accessed graph queries and cache the results of such. Further embodiments may store complete data of the data sources to avoid the translation process and hopping across data sources to fetch data based on performance demands.

Figure 2A:
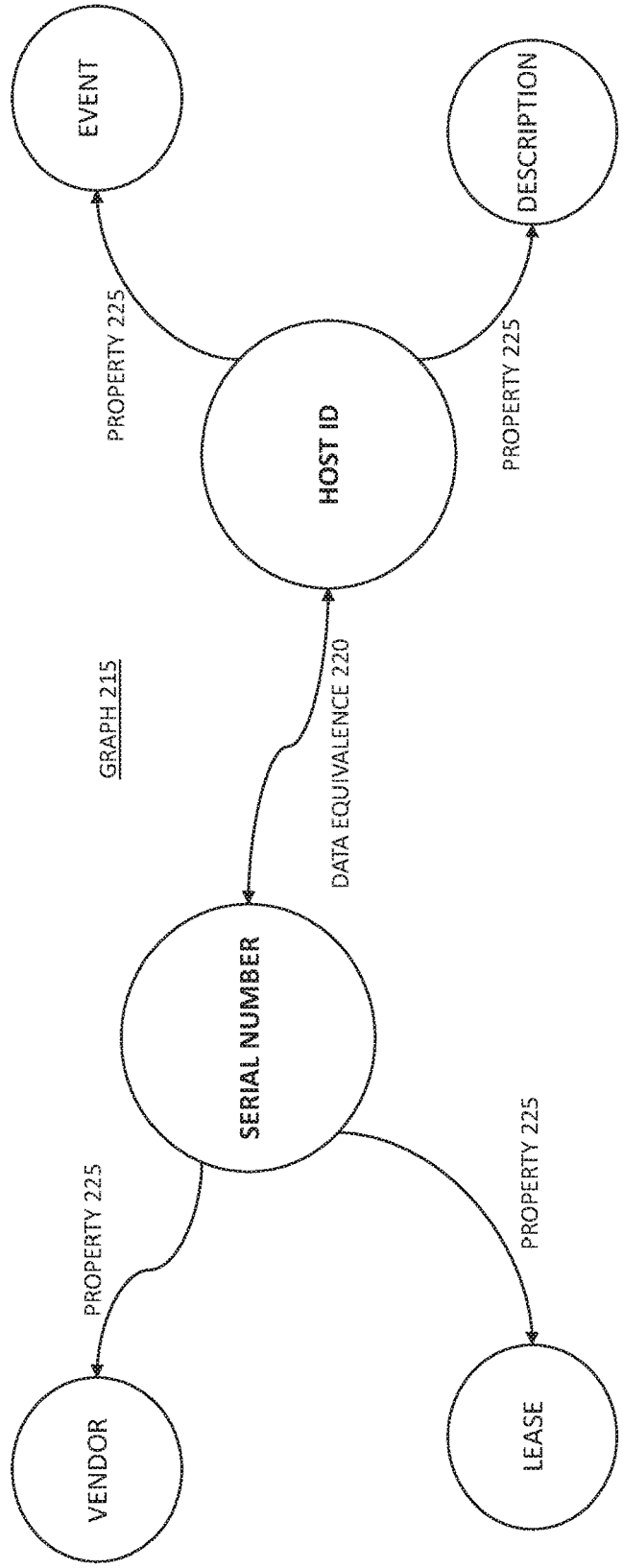
FIG. 2A illustrates creating a graph of contents of multiple databases in accordance with embodiments of the invention.
Figure 2B:
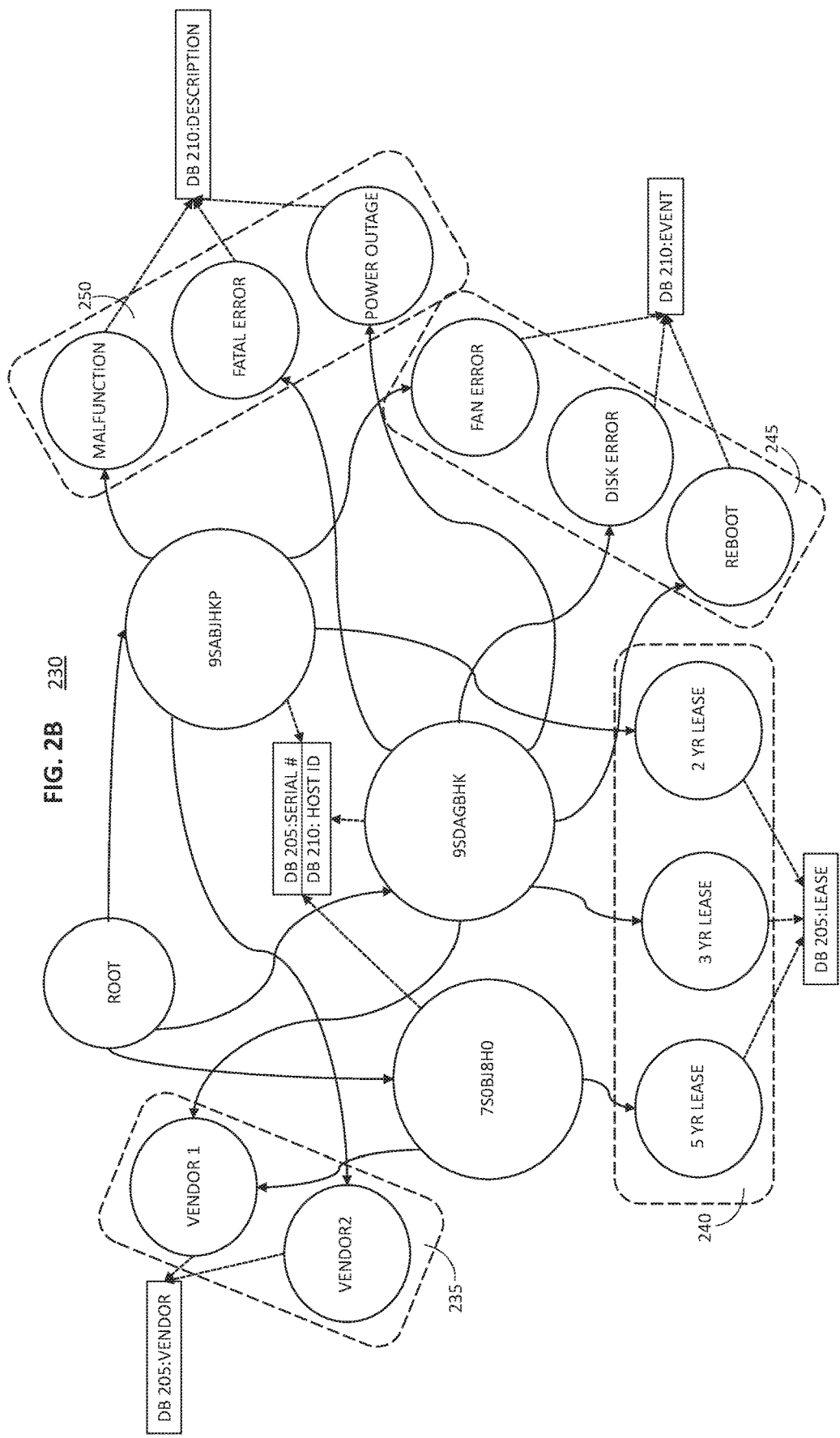
FIG. 2B further illustrates creating a graph of contents of multiple databases in accordance with embodiments of the invention.

With reference to FIGS. 2A and 2B an example of graph creation engine 192 creating a graph 310 from entities within or across multiple data stores is illustrated. In this simple example, only two data stores are involved, an asset database 205 and an operational database 210. Of course, many more databases may be used in a real-world scenario—there may be tens or hundreds of applications and hundreds to thousands of tables on databases and millions of rows of data that need to be connected to enable semantically rich querying capabilities. Returning to the figures, consider an example where a user wants to find out if the leas of an asset or assets can be extended or not based on its operational performance. The asset database 205 has a table of assets and the operations database 210 has a table of operational data of assets. In this example, the serial number is a unique key in the asset database 205 to identify an asset and in the operational database 210 there is information related to the events of these assets which are identified by host ID. One example challenge is how to unify the data in the two databases to identify a trend of issues that are reported for vendor 1 during a 3 year lease period versus a 5 year lease period to help a user decide if it is better to pursue a longer leasing period or a shorting leasing period. To solve this, embodiments of the invention create the graph structure with the relationships illustrated in FIG. 2B.

The serial number field is an entity in asset database 205 that contains data or information that is similar to the entity that is the host ID field in operational database 210. Thus, based on the similarity of and/or frequency with which this data or information occurs within and across the databases 205 and 210, graph creation engine identifies these two entities as similar, that is, as having a data equivalence 220 in the graph structure 215 that it creates. By virtue of asset database 205 including vendor and lease years fields in each row, these entities are related to the serial number in asset database 205, and therefore, related to the host ID in operational database 210. Likewise, by virtue of operational database including event and description fields in each row, these entities are related to the host ID in operational database 210, and therefore, related to the serial number field in asset database 205. Thus, these entities are all represented by nodes in graph structure 215, and connected at properties 225 in graph structure 215 to show the relationships between the entities represented by the nodes.

With the generated graph structure 215 as illustrated in FIG. 2B, now leasing information and the events of the assets are connected with a second degree relationship and the above query can be answered using a simple connected graph query. In a real world scenario this graph enables one to exponentially improve the ability to answer more complex queries where data is connected and N degrees apart based on any relationships and combinations that can be thought of.

With reference to FIG. 2B, the actual graph 230 that is generated by graph creation engine 185, according to the graph structure 215 and the actual contents of databases 205 and 210, is illustrated. The root of the graph points to three primary nodes 9SDAGBHK, 9SABJHKP, and 7S0BJ8H0. These primary nodes in the graph represent specific entities having those values in both databases 205 and 210. In this example, each node merges the serial number and hosts ID entities in databases 205 and 210, since graph creation engine determined these fields were identical or similar, according to one or more of the methods described above. In this manner, generally, nodes in the relationships graph may represent multiple instances of an entity stored within or across the plurality of data stores where the similarity and frequency of the instances of the entities, as determined, for example, by the attribute-value expressions (e.g., type-value pair) for the instances of the entity stored within or across the plurality of data stores meets or exceeds a score or threshold, for example, two occurrences.

In embodiments of the invention, each node comprises an identity for, or pointer to, each of the databases and the entities respectively stored therein from which the node was generated, so that when a graph query is received at step 420, it can be translated into data store queries to be executed against the databases and data stores by using the information stored in each node regarding the identity for, or pointer to, each of the databases and the entities respectively stored therein from which the node was generated, as described below.

Thus, for example, each of the primary nodes includes a pointer to a particular row in the respective database 205: serial number field and database 210:host ID field that matches the value of the entity represented by primary node stored in the graph 230. Likewise, the primary nodes are linked to the associated entities in the vendor and lease year fields in database 205 and the associated entities in the event and description fields in operational database 210. These links (represented by unidirectional arrows in FIG. 2B) indicate relationships between a specific serial number/host ID entity and one or more specific entities in the vendor and lease year fields in database 205 and one or more specific entities in the event and description fields in operational database 210. The vendor nodes at 235 in graph 230 include respective pointers to the appropriate row(s) in the vendor field in database 205. Likewise, the lease year nodes at 240 in graph 230 include respective pointers to the appropriate row(s) in the lease years fields in asset database 205. Similarly, the event nodes at 245 in graph 230 include respective pointers to the appropriate row(s) in the event field in database 210, and finally, the description nodes at 250 in graph 230 include respective pointers to the appropriate row(s) in the description field in database 210. With these pointers, when a graph query is received at step 420, it can be translated into data store queries that can be executed against the databases 205 and 210, as described below.

At logic block 420, graph query interface 193 receives a graph query against selected nodes and edges in the graph store. For example, a user selects and, at logic block 425, generates a query about a number of nodes and their respective relationships in the graph. However, this query is not executed against the graph stored in the graph store. Rather, query generation and result aggregation engine 180 parses the graph query, and using the information obtained from the graph store, in particular, the pointers to the corresponding entities and links within and across the data stores 155A, 155B and 155C, generates a data store query, for example, a relational database query, to be executed against the corresponding entities in the data stores pointed to by the associated pointers in the graph. Generally, then, query generation and results aggregation engine generates one or more data store queries to be executed against respective selected ones of the one or more entities and their respective identified relationships based on the graph query and the graph store by selecting the one or more of the plurality of data stores and selecting the ones of the one or more entities stored therein based on the identity for, or pointer to, each of the one or more data stores and the one or more entities respectively stored for (i.e., within) each node in the relationships graph.

At logic block 430, query generation and result aggregation engine 180 executes the one or more data store queries, generated at logic block 425, against the selected one or more of the plurality of data stores. For example, the engine 180 may execute one or more relational database queries, e.g., SQL database queries, on relational database system 155A, one or more non-relational database queries, e.g., noSQL database queries, on non-relational database system 155B, and one or more unstructured data queries against one or more unstructured data stores or sources 155C.

At logic block 435, the query generation and result aggregation engine 180 receives the results of the execution of the one or more data store queries against one or more of the relational databases 155A, non-relational databases 155B, and unstructured data stores 155C, and, at logic block 440, composes a response to the graph query for the selected ones of the one or more entities and their identified relationships based on the results of the execution of the one or more data store queries. In other words, the query generation and result aggregation engine 180 receives all the results of the multiple queries executed across the multiple data stores, and using the original graph query, the structure of the graph, the pointers stored in the nodes of the graph to walk back from the entities queried across the multiple data stores to the nodes representing the entities in the graph, and combines the results into a response that is provided to the user via graph query interface 193. In one embodiment, composing the response to the graph query for the selected ones of the one or more entities and their identified relationships based on the results of the execution of the one or more data store queries involves composing the response to the graph query based on instructions (e.g., semantics) set forth in the graph query itself for manipulating (e.g., merging) the selected ones of the one or more entities.

In one embodiment, query generation and result aggregation engine 180 is a single logic block as depicted in the figures. In another embodiment, the functional aspects of query generation may be separated from the functional aspects of result aggregation into two separate engines.

Figure 5A:
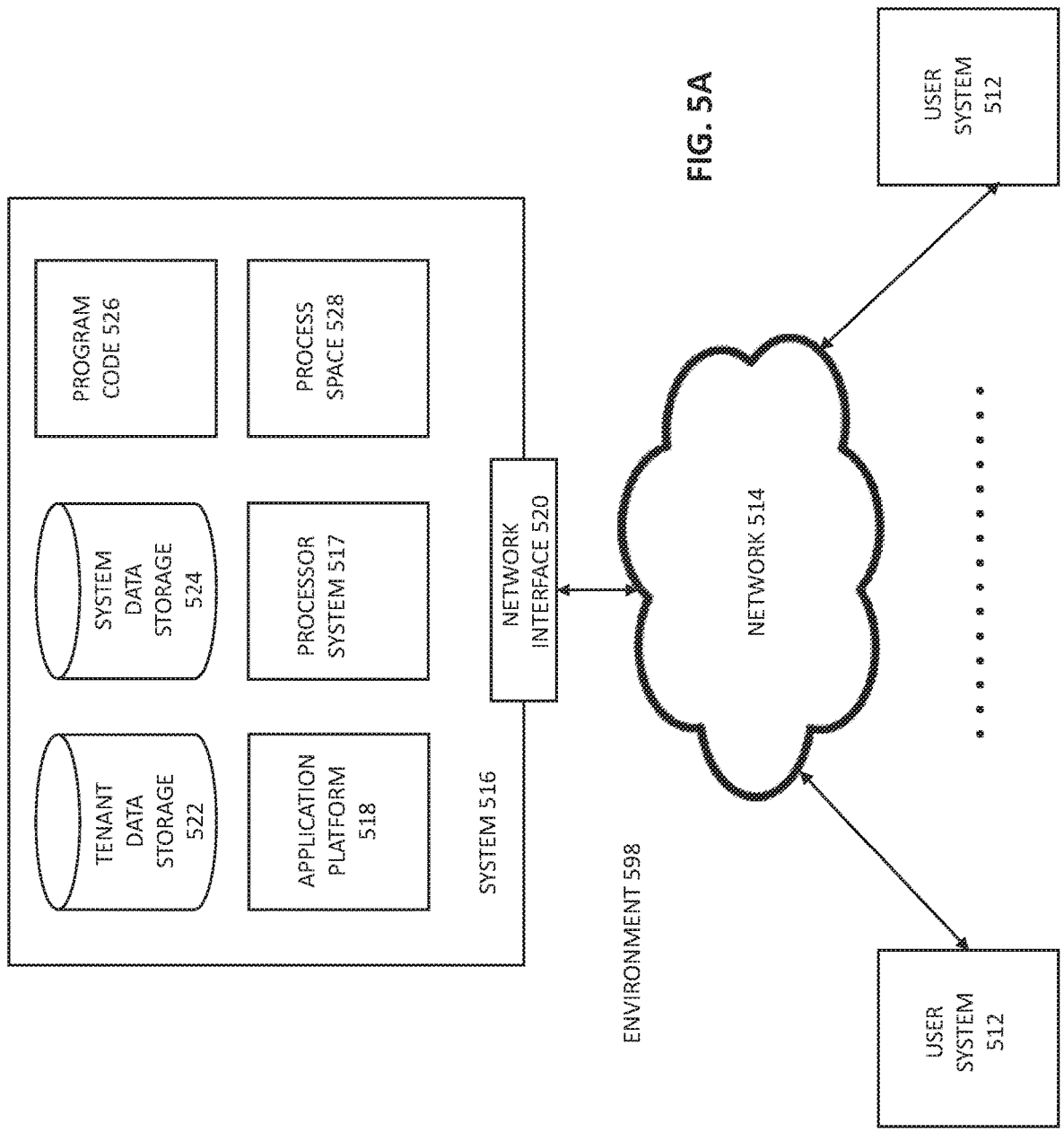
FIG. 5A illustrates a block diagram of an environment in which an on-demand database service may operate in accordance with the described embodiments.

FIG. 5A illustrates a block diagram of an environment 598 in which an on-demand database service may operate in accordance with the described embodiments. Environment 598 may include user systems 512, network 514, system 516, processor system 517, application platform 518, network interface 520, tenant data storage 522, system data storage 524, program code 526, and process space 528. In other embodiments, environment 598 may not have all of the components listed and/or may have other elements instead of, or in addition to, those listed above.

Environment 598 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5A (and in more detail in FIG. 5B) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" is used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5A, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5A, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5A include conventional, well-known elements that are explained only briefly here. For example, each user system 512 may include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5B:
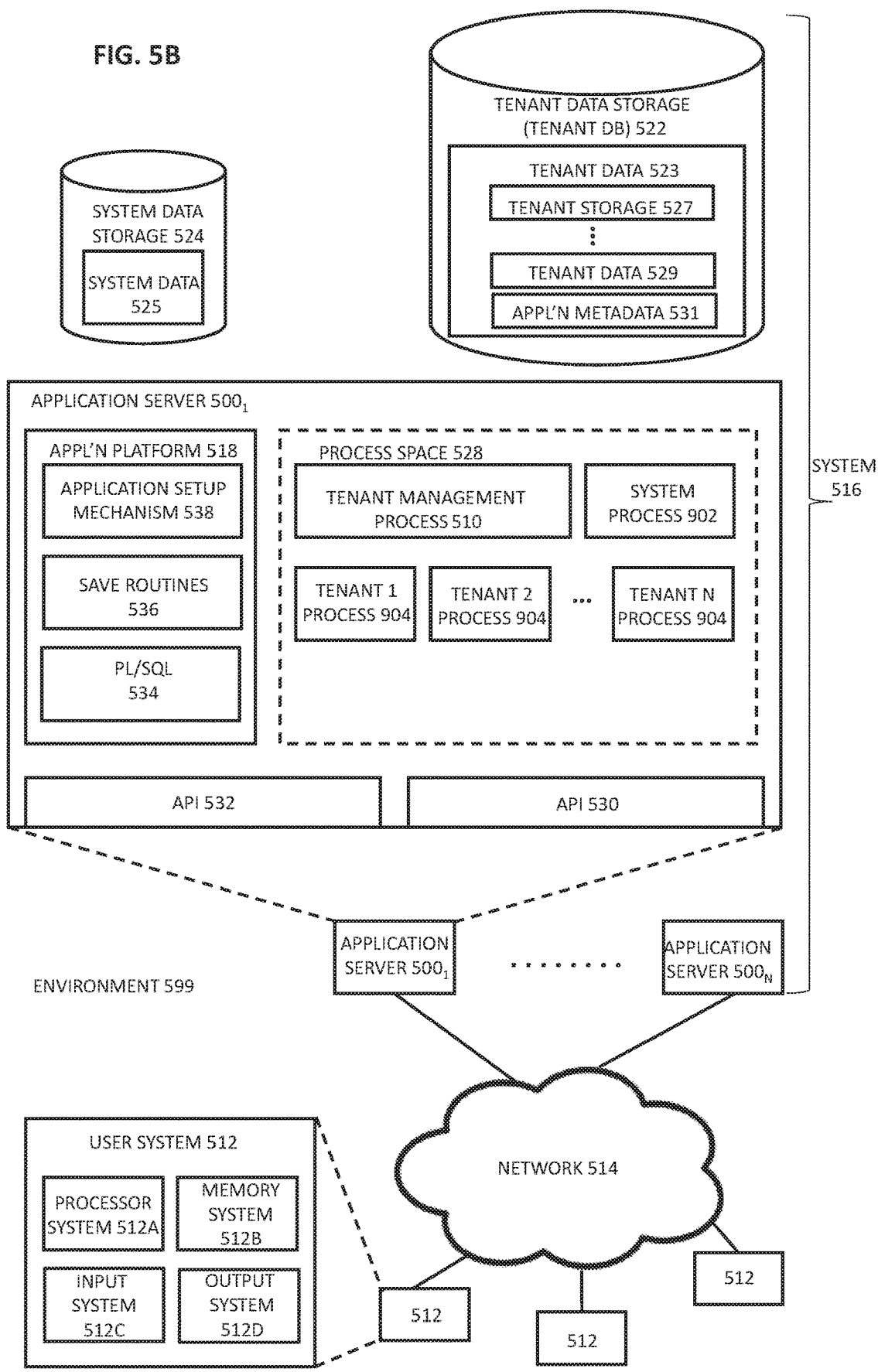
FIG. 5B illustrates another block diagram of an embodiment of elements of FIG. 5A and various possible interconnections between such elements in accordance with the described embodiments.

FIG. 5B illustrates another block diagram of an embodiment of elements of FIG. 5A and various possible interconnections between such elements in accordance with the described embodiments. FIG. 5B also illustrates environment 599. However, in FIG. 5B, the elements of system 516 and various interconnections in an embodiment are illustrated in further detail. More particularly, FIG. 5B shows that user system 512 may include a processor system 512A, memory system 512B, input system 512C, and output system 512D. FIG. 5B shows network 514 and system 516. FIG. 5B also shows that system 516 may include tenant data storage 522, having therein tenant data 523, which includes, for example, tenant storage space 527, tenant data 529, and application metadata 531. System data storage 524 is depicted as having therein system data 525. Further depicted within the expanded detail of application servers $500_{1-N}$ are User Interface (UI) 530, Application Program Interface (API) 532, application platform 518 includes PL/SOQL 534, save routines 536, application setup mechanism 538, process space 528 includes system process space 502, tenant 1-N process spaces 504, and tenant management process space 510. In other embodiments, environment 599 may not have the same elements as those listed above and/or may have other elements instead of, or in addition to, those listed above.

User system 512, network 514, system 516, tenant data storage 522, and system data storage 524 were discussed above in FIG. 5A. As shown by FIG. 5B, system 516 may include a network interface 520 (of FIG. 5A) implemented as a set of HTTP application servers 500, an application platform 518, tenant data storage 522, and system data storage 524. Also shown is system process space 502, including individual tenant process spaces 504 and a tenant management process space 510. Each application server 500 may be configured to tenant data storage 522 and the tenant data 523 therein, and system data storage 524 and the system data 525 therein to serve requests of user systems 512. The tenant data 523 might be divided into individual tenant storage areas (e.g., tenant storage space 527), which can be either a physical arrangement and/or a logical arrangement of data. Within each tenant storage space 527, tenant data 529, and application metadata 531 might be similarly allocated for each user. For example, a copy of a user's most recently used (MRU) items might be stored to tenant data 529. Similarly, a copy of MRU items for an entire organization that is a tenant might be stored to tenant storage space 527. A UI 730 provides a user interface and an API 532 provides an application programmer interface into system 516 resident processes to users and/or developers at user systems 512. The tenant data and the system data may be stored in various databases, such as one or more Oracle™ databases.

Application platform 518 includes an application setup mechanism 538 that supports application developers' creation and management of applications, which may be saved as metadata into tenant data storage 522 by save routines 536 for execution by subscribers as one or more tenant process spaces 504 managed by tenant management process space 510 for example. Invocations to such applications may be coded using PL/SOQL 534 that provides a programming language style interface extension to API 532. Invocations to applications may be detected by one or more system processes, which manages retrieving application metadata 531 for the subscriber making the invocation and executing the metadata as an application in a virtual machine.

Each application server 500 may be communicably coupled to database systems, e.g., having access to system data 525 and tenant data 523, via a different network connection. For example, one application server $500_1$ might be coupled via the network 514 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 512 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user may hit three different application servers 500, and three requests from different users may hit the same application server 500. In this manner, system 516 is multi-tenant, in which system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 500 to request and update system-level and tenant-level data from system 516 that may require sending one or more queries to tenant data storage 522 and/or system data storage 524. System 516 (e.g., an application server 500 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and a persistent database and/or a multi-tenant database implementation), which communicate with each other via a bus 630. Main memory 604 includes a query generation and results aggregation engine 624 by which to interface tenants and users of the host organization with data base system 130. Main memory 604 also includes a graph creation engine 623 and a relationships discovery engine 625. Main memory 604 and its sub-elements are operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display, etc.), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable storage medium or a non-transitory computer readable storage medium or a non-transitory machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

None of the claims herein are intended to invoke paragraph six of 35 U.S.C. § 112(f) unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method, comprising:
    generating, with a graph creation engine of a web services bridge, a relationships graph based on identifying entities stored within or across a plurality of data stores, the plurality of data stores comprising relational databases, non-relational databases, and unstructured data, and relationships between the entities, the relationships graph having:
        nodes to represent one or more entities, wherein each node comprises a pointer to each of the plurality of data stores containing the one or more entities from which the node was generated, and
        edges between any two nodes representing the relationships between the one or more entities represented by each of the two nodes;
    storing the relationships graph in a graph store;
    receiving, with a graph query interface of the web services bridge from a web server, a graph query against selected nodes and edges in the graph store;
    translating, with a query generation and result aggregation engine, the graph query into one or more data store queries to be executed against the plurality of data stores by:
        parsing the graph query by identifying, through the respective pointers of the selected nodes and edges, the data stores associated with the selected nodes and edges, the identified data stores comprising one or more of the relational databases, the non-relational databases, and the unstructured data, and
        generating, based on the data stores identified by parsing the graph query to identify the respective pointers of the selected nodes and edges, the one or more data store queries to be executed against the identified data stores;
    executing, with the graph query interface, the one or more data store queries by:
        selecting the one or more of the plurality of data stores, and
        selecting, from the relationships graph, one or more nodes representing entities stored within the plurality of data stores based on: (i) the relationships between the entities, and (ii) the pointer from the relationships graph; and
    composing, with the query generation and result aggregation engine, a response to the graph query based on the results of the execution of the one or more data store queries via:
        receiving results of the data store queries executed against the plurality of data stores,
        tracking from the entities to the nodes, based on one or more of: (i) the graph query, (ii) the relationships graph, and (iii) the pointer, and
        combining the results of the data store queries and tracking into a response to the graph query.

2. The method of claim 1, wherein identifying entities stored within or across the plurality of data stores and relationships between the entities comprises identifying entities stored within or across one or more of: a relational database, an SQL database, a non-relational database, a non-SQL database, an unstructured database, and unstructured data.

3. The method of claim 1:
    wherein identifying the entities and the relationships between the entities comprises either receiving user input identifying the relationships between entities or receiving meta-data regarding the entities and the plurality of data stores; and
    wherein the method further comprises automatically identifying relationships between the entities stored within or across the plurality of data stores based on the meta-data.

4. The method of claim 3, wherein receiving meta-data regarding the entities and the plurality of data stores and automatically identifying relationships between the entities stored within or across the plurality of data stores based on the metadata comprises one or more of:
    receiving user or machine learning input identifying one or both of a similarity and frequency of an attribute-value expression for instances of an entity stored within or across the plurality of data stores;
    receiving a plurality of workflows applied to the entities stored within or across the plurality of data stores, and identifying relationships between the entities stored within or across the plurality of data stores based on an analysis of the plurality of work flows applied to the entities;
    receiving a respective data definition language (DDL) of a schema for each of a plurality of relational databases, and identifying relationships between the entities stored within or across the plurality of relational databases based on an analysis of the DD Ls of the schemas;
    receiving user input identifying instances of entities within or across the plurality of data stores that are the same, and identifying relationships between the same instances of entities stored within or across the plurality of data stores;
receiving one or more of query logs and usage logs of the plurality of data stores; and
identifying relationships between the entities stored within or across the plurality of data stores based on an analysis of the query logs and usage logs.

5. The method of claim 1, wherein the method implements a cloud computing platform to provide on-demand cloud based computing services to subscribers of the cloud computing platform; and
wherein end users of the cloud computing platform are each associated with one of a plurality of customer organizations having subscriber access to the on-demand cloud based computing services provided by the cloud computing platform.

6. The method of claim 1, wherein the nodes in the relationships graph that represent the one or more entities comprise nodes in the relationships graph that represent multiple instances of an entity stored within or across the plurality of data stores where the similarity and frequency of an attribute-value expression for the instances of the entity stored within or across the plurality of data stores exceeds a threshold.

7. The method of claim 1, wherein executing the one or more data store queries further comprises: generating one or more data store queries to be executed against respective selected ones of the one or more entities and their respective identified relationships based on the graph query and the graph store, selecting one or more of the plurality of data stores, and selecting the ones of the one or more entities stored therein based on the identity for or pointer to each of the one or more data stores and the one or more entities respectively stored for or within each node in the relationships graph.

8. The method of claim 1, wherein composing the response to the graph query is for the selected ones of the one or more entities and their relationships based on the results of the execution of the one or more data store queries and further comprises composing the response to the graph query based on instructions set forth in the graph query itself for manipulating the selected ones of the one or more entities.

9. Non-transitory computer readable storage media having instructions stored thereupon that, when executed by a processor of a system in a host organization, the instructions cause the processor to perform operations including:
generating, with a graph creation engine of a web services bridge, a relationships graph based on identifying entities stored within or across a plurality of data stores, the plurality of data stores comprising relational databases, non-relational databases, and unstructured data, and relationships between the entities, the relationships graph having:
nodes to represent one or more entities, wherein each node comprises a pointer to each of the plurality of data stores containing the one or more entities from which the node was generated, and
edges between any two nodes representing the relationships between the one or more entities represented by each of the two nodes;
storing the relationships graph in a graph store;
receiving, with a graph query interface of the web services bridge from a web server, a graph query against selected nodes and edges in the graph store;
translating, with a query generation and result aggregation engine, the graph query into one or more data store queries to be executed against the plurality of data stores by:
parsing the graph query by identifying, through the respective pointers of the selected nodes and edges, the data stores associated with the selected nodes and edges, the identified data stores comprising one or more of the relational databases, the non-relational databases, and the unstructured data, and
generating, based on the data stores identified by parsing the graph query to identify the respective pointers of the selected nodes and edges, the one or more data store queries to be executed against the identified data stores;
executing, with the graph query interface, the one or more data store queries by:
selecting the one or more of the plurality of data stores, and
selecting, from the relationships graph, one or more nodes representing entities stored within the plurality of data stores based on: (i) the relationships between the entities, and (ii) the pointer from the relationships graph; and
composing, with the query generation and result aggregation engine, a response to the graph query based on the results of the execution of the one or more data store queries via:
receiving results of the data store queries executed against the plurality of data stores,
tracking from the entities to the nodes, based on one or more of: (i) the graph query, (ii) the relationships graph, and (iii) the pointer, and
combining the results of the data store queries and tracking into a response to the graph query.

10. The non-transitory computer readable storage media of claim 9, wherein the instructions that cause the system to perform the operation of identifying entities stored within or across the plurality of data stores and relationships between the entities comprise instructions that cause the system to perform an operation of identifying entities stored within or across one or more of: a relational database, an SQL database, a non-relational database, a non-SQL database, an unstructured database, and unstructured data.

11. The non-transitory computer readable storage media of claim 9, wherein the instructions that cause the system to perform the operation of identifying the entities and the relationships between the entities comprise instructions that cause the system to perform one or more of the operations of:
receiving user input identifying the relationships between entities; and
receiving meta-data regarding the entities and the plurality of data stores and automatically identifying relationships between the entities stored within or across the plurality of data stores based on the meta-data.

12. The non-transitory computer readable storage media of claim 11, wherein the instructions that cause the system to perform the operation of receiving meta-data regarding the entities and the plurality of data stores and automatically identifying relationships between the entities stored within or across the plurality of data stores based on the meta-data comprise instructions that cause the system to perform one or more of the operations of:

receiving input identifying one or both of a similarity and frequency of an attribute-value expression for instances of an entity stored within or across the plurality of data stores;

receiving a plurality of workflows applied to the entities stored within or across the plurality of data stores, and identifying relationships between the entities stored within or across the plurality of data stores based on an analysis of the plurality of work flows applied to the entities;

receiving a respective data definition language (DDL) of a schema for each of a plurality of relational databases, and identifying relationships between the entities stored within or across the plurality of relational databases based on an analysis of the DDLs of the schemas;

receiving user input identifying instances of entities within or across the plurality of data stores that are the same, and identifying relationships between the same instances of entities stored within or across the plurality of data stores; and receiving one or more of query logs and usage logs of the plurality of data stores, and identifying relationships between the entities stored within or across the plurality of data stores based on an analysis of the query logs and usage logs.

13. The non-transitory computer readable storage media of claim 9, wherein the nodes in the relationships graph that represent the one or more entities each comprise an identity for each of the plurality of data stores and the one or more entities respectively stored therein from which the node was generated.

14. The non-transitory computer readable storage media of claim 9, wherein the nodes in the relationships graph that represent the one or more entities comprise nodes in the relationships graph that represent multiple instances of an entity stored within or across the plurality of data stores where the similarity and frequency of an attribute-value expression for the instances of the entity stored within or across the plurality of data stores exceeds a threshold.

15. The non-transitory computer readable storage media of claim 9, wherein the instructions that cause the system to perform the operation of executing the one or more data store queries further comprises: selecting one or more of the plurality of data stores, and selecting the ones of the one or more entities stored therein based on the identity for each of the one or more data stores and the one or more entities respectively stored for each node in the relationships graph.

16. The non-transitory computer readable storage media of claim 9, wherein the instructions that cause the system to perform the operation of composing the response to the graph query is for the selected ones of the one or more entities and their relationships based on the results of the execution of the one or more data store queries and further comprise instructions that cause the system to perform the operation of composing the response to the graph query based on instructions set forth in the graph query itself for manipulating the selected ones of the one or more entities.

17. A system to execute at a host organization, wherein the system comprises:
a hosted computing environment comprising:
a web services bridge comprising:
a graph creation engine; and
a graph query interface;
a query generation and result aggregation engine; and
a plurality of data stores comprising:
relational databases;
non-relational databases; and
unstructured data;
a memory to store instructions;
a set of one or more processors; and
a non-transitory machine-readable storage medium that provides instructions that, when executed by the set of one or more processors, the instructions stored in the memory are configurable to cause the system to perform operations comprising:
generating, with the graph creation engine, a relationships graph based on identifying entities stored within or across the plurality of data stores and relationships between the entities, the relationships graph having:
nodes to represent one or more entities, wherein each node comprises a pointer to each of the plurality of data stores containing the one or more entities from which the node was generated, and
edges between any two nodes to represent the identified relationships between the one or more entities represented by each of the two nodes;
storing the relationships graph in a graph store;
receiving, with the graph query interface from a web server, a graph query against selected nodes and edges in the graph store;
translating, with the query generation and result aggregation engine, the graph query into one or more data store queries to be executed against the plurality of data stores by:
parsing the graph query by identifying, through the respective pointers of the selected nodes and edges, the data stores associated with the selected nodes and edges, the identified data stores comprising one or more of the relational databases, the non-relational databases, and the unstructured data, and
generating, based on the data stores identified by parsing the graph query to identify the respective pointers of the selected nodes and edges, the one or more data store queries to be executed against the identified data stores;
executing, with the graph query interface, the one or more data store queries by:
selecting the one or more of the plurality of data stores, and
selecting from the relationships graph, one or more nodes representing entities stored within the plurality of data stores based on: (i) the relationships between the entities, and (ii) the pointer from the relationships graph; and
composing, with the query generation and result aggregation engine, a response to the graph query based on the results of the execution of the one or more data store queries via:
receiving results of the data store queries executed against the plurality of data stores,
tracking from the entities to the nodes, based on one or more of: (i) the graph query, (ii) the relationships graph, and (iii) the pointer, and
combining the results of the data store queries and tracking into a response to the graph query.

18. The system of claim 17, wherein identifying entities stored within or across the plurality of data stores and relationships between the entities comprises the processor to execute the instructions to cause the system to identify entities stored within or across one or more of: a relational database, an SQL database, a non-relational database, a non-SQL database, an unstructured database, and unstructured data.

19. The system of claim 17, wherein identifying the entities and the relationships between the entities comprises one or more of:
receive user input identifying the relationships between entities; and
receive meta-data regarding the entities and the plurality of data stores and automatically identify relationships between the entities stored within or across the plurality of data stores based on the meta-data.

20. The system of claim 19, wherein receiving meta-data regarding the entities and the plurality of data stores and automatically identify relationships between the entities stored within or across the plurality of data stores based on the meta-data comprises one or more of:
receive input identifying one or both of a similarity and frequency of an attribute-value expression for instances of an entity stored within or across the plurality of data stores;
receive a plurality of workflows applied to the entities stored within or across the plurality of data stores, and identify relationships between the entities stored within or across the plurality of data stores based on an analysis of the plurality of work flows applied to the entities;
receive a respective data definition language (DDL) of a schema for each of a plurality of relational databases, and identify relationships between the entities stored within or across the plurality of relational databases based on an analysis of the DD Ls of the schemas;
receive user input identifying instances of entities within or across the plurality of data stores that are the same, and identify relationships between the same instances of entities stored within or across the plurality of data stores; and
receive one or more of query logs and usage logs of the plurality of data stores, and identify relationships between the entities stored within or across the plurality of data stores based on an analysis of the query logs and usage logs.

21. The system of claim 17, wherein the nodes in the relationships graph that represent the one or more entities each comprise an identity for each of the plurality of data stores and the one or more entities respectively stored therein from which the node was generated.

22. The system of claim 17, wherein the nodes in the relationships graph that represent the one or more entities comprise nodes in the relationships graph that represent multiple instances of an entity stored within or across the plurality of data stores where the similarity and frequency of an attribute-value expression for the instances of the entity stored within or across the plurality of data stores exceeds a threshold.

23. The system of claim 17, wherein executing the one or more data store queries further comprises: selecting one or more of the plurality of data stores and selecting the ones of the one or more entities stored therein based on the identity for each of the one or more data stores and the one or more entities respectively stored for each node in the relationships graph.

24. The system of claim 17, wherein composing the response to the graph query is for the selected ones of the one or more entities and their relationships based on the results of the execution of the one or more data store queries and further comprises composing the response to the graph query based on instructions set forth in the graph query itself for manipulating the selected ones of the one or more entities.

* * * * *